(12) United States Patent
Hauck et al.

(10) Patent No.: US 9,447,825 B2
(45) Date of Patent: Sep. 20, 2016

(54) CLUTCH DEVICE

(75) Inventors: Hans Juergen Hauck, Schwaebisch Hall (DE); Tobias Zacher, Drei Gleichen / OT Muehlberg (DE)

(73) Assignee: BorgWarner Inc., Auburn Hills, MI (US)

( * ) Notice: Subject to any disclaimer, the term of this patent is extended or adjusted under 35 U.S.C. 154(b) by 329 days.

(21) Appl. No.: 13/333,695

(22) Filed: Dec. 21, 2011

(65) Prior Publication Data

US 2012/0152684 A1 Jun. 21, 2012

(30) Foreign Application Priority Data

Dec. 21, 2010 (DE) .................. 10 2010 055 334
Mar. 23, 2011 (DE) .................. 10 2011 014 778

(51) Int. Cl.
| F16D 21/00 | (2006.01) |
| F16D 13/52 | (2006.01) |
| F16D 13/58 | (2006.01) |
| F16D 21/06 | (2006.01) |
| F16D 13/69 | (2006.01) |

(52) U.S. Cl.
CPC .............. *F16D 13/52* (2013.01); *F16D 13/58* (2013.01); *F16D 21/06* (2013.01); *F16D 13/69* (2013.01); *F16D 2021/0661* (2013.01); *F16D 2300/12* (2013.01); *F16D 2300/26* (2013.01); *Y10T 29/49826* (2015.01)

(58) Field of Classification Search
CPC ........ F16D 13/52; F16D 13/58; F16D 21/06; F16D 13/69; F16D 2021/0661; F16D 2300/26; F16D 2300/12
USPC .......... 192/48.603, 70, 70.28, 89.24, 48.601, 192/48.1
See application file for complete search history.

(56) References Cited

U.S. PATENT DOCUMENTS

| 4,751,990 A | * | 6/1988 | Schraut et al. ............ 192/70.27 |
| 4,848,555 A | * | 7/1989 | Riese et al. .............. 192/70.252 |
| 6,039,161 A | * | 3/2000 | Tanaka et al. ............. 192/70.18 |
| 6,070,708 A | * | 6/2000 | Fukuda et al. ............. 192/70.21 |
| 8,459,427 B2 | * | 6/2013 | McCutcheon et al. .... 192/70.18 |

* cited by examiner

*Primary Examiner* — David J Hlavka
(74) *Attorney, Agent, or Firm* — BrooksGroup

(57) ABSTRACT

A clutch device for arrangement in a drive train of a motor vehicle between a drive unit and a transmission is provided. The clutch device may include a multiple-disk clutch arrangement for selective torque transfer between the drive unit and the transmission. The multiple-disk clutch arrangement may be actuable via a force transfer element supported on a disk carrier of the multiple-disk clutch arrangement.

16 Claims, 10 Drawing Sheets

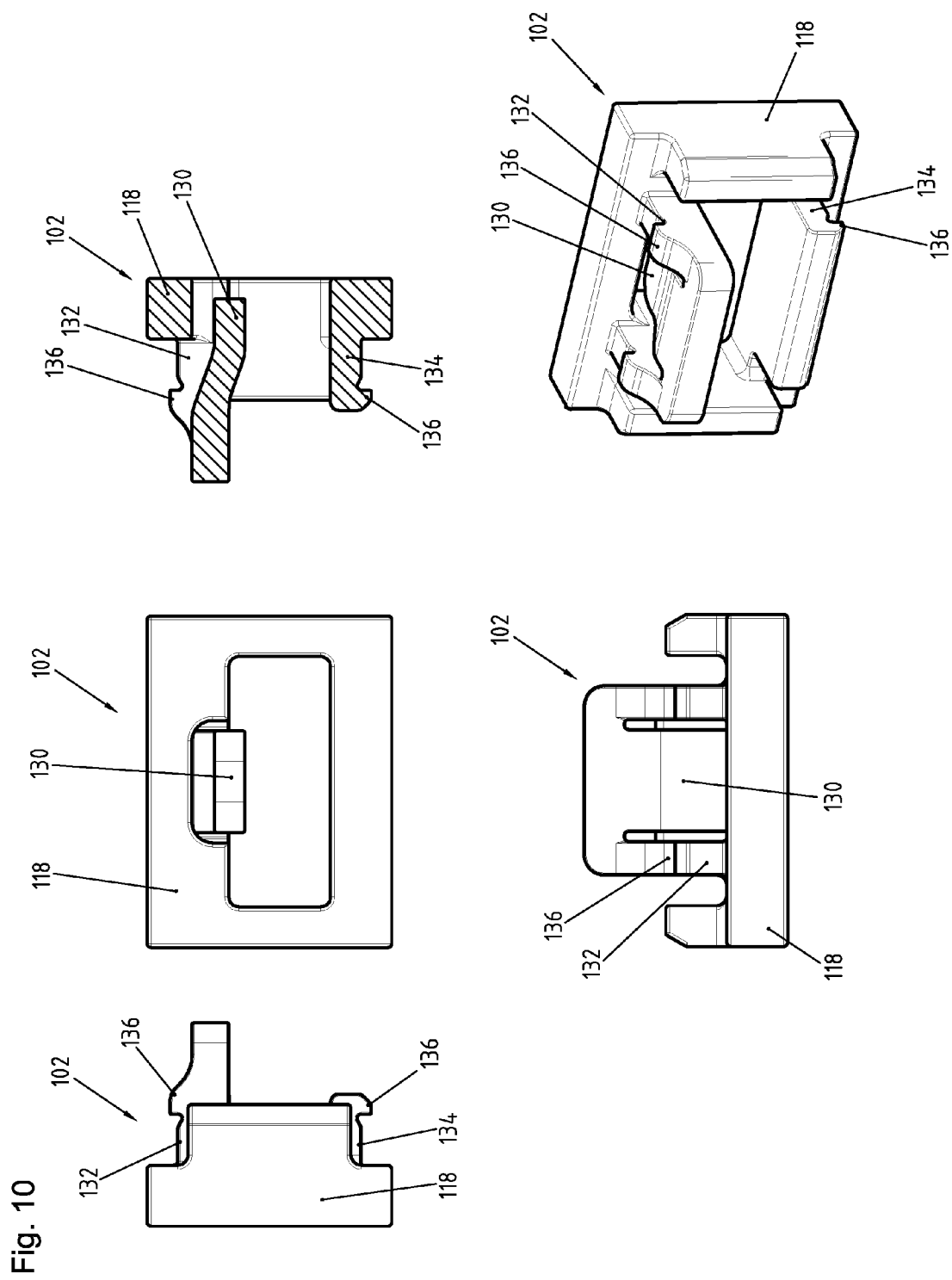

CLUTCH DEVICE

CROSS-REFERENCE TO RELATED APPLICATIONS

This application claims priority to German patent application numbers DE 102010055334.4, filed on Dec. 21, 2010, DE 102011014778.0, filed on Mar. 23, 2011, and a German application filed on Dec. 19, 2011, the application number of which is unknown at the time of this filing, which are hereby incorporated by reference in their entirety.

TECHNICAL FIELD

This disclosure relates to clutch devices for selectively transferring torque.

BACKGROUND

Clutch devices may be used to selectively transfer torque between a drive unit and a transmission shaft. Clutch devices may be complex mechanisms that can be difficult to assemble in some cases.

SUMMARY

The present disclosure relates to a clutch device for arrangement in a drive train of a motor vehicle between a drive unit and a transmission, which clutch device has at least one multiple-disk clutch arrangement, assigned to a transmission input shaft, for selective torque transfer between the drive unit and the transmission input shaft, the multiple-disk clutch arrangement being actuable via a force transfer element.

Clutch devices for arrangement between a drive unit and a transmission have at least one multiple-disk clutch arrangement, the multiple-disk clutch arrangement being actuable via a force transfer element. Clutch devices have proved successful, but can be difficult to assemble or to mount.

The present disclosure provides embodiments of clutch devices which can be assembled or mounted especially simply at low outlay in structural terms.

In one embodiment, the clutch device, which may be a multiple clutch device or a dual clutch device, can be arranged in a drive train of a motor vehicle between a drive unit and a transmission. The clutch device may include a multiple-disk clutch arrangement, assigned to a transmission input shaft, for selective torque transfer between the drive unit and the transmission input shaft. The multiple-disk clutch arrangement may be actuated via a force transfer element. The actuation force for the multiple-disk clutch arrangement may be transferred via the force transfer element, directly or indirectly, to the disks or disk stack of the multiple-disk clutch arrangement. The force transfer element may be supportable or supported captively on a disk carrier of the multiple-disk clutch arrangement.

The force transfer element can be combined with the multiple-disk clutch arrangement to form a coherent structural unit or a coherent module, the handling of which is simplified since no additional outlay has to be involved in order to ensure that such a structural unit or such a module is held together while it is being mounted on another structural unit. The mounting of such a clutch device is therefore especially simple. Also, the clutch device may include benefits for mounting purposes particularly when the clutch device is a clutch device in which the actual actuation device of the multiple-disk clutch arrangement and the force transfer element belong to different subassemblies or modules which are not mounted together simultaneously or are mounted independently or separately from one another.

So that the captive support of the force transfer element on the disk carrier of the multiple-disk clutch arrangement can be brought about especially quickly and simply and thus in order to simplify the mounting of the clutch device even further, in a one embodiment of the clutch device, the force transfer element is latchable or latched with the disk carrier of the multiple-disk clutch arrangement. For example, corresponding latching means may be provided on the force transfer element and/or on the disk carrier of the multiple-disk clutch arrangement, in which case the latching means may be produced both in one piece with the respective component and separately from it.

In one embodiment of the clutch device, the multiple-disk clutch arrangement is actuable hydraulically. For example, a corresponding actuation piston for acting upon the force transfer element may be provided, the actuation piston being assigned a corresponding pressure chamber for the hydraulic medium.

In another embodiment of the clutch device, the multiple-disk clutch arrangement is a wet-running multiple-disk clutch arrangement. In this embodiment, the disks of the multiple-disk clutch arrangement run in a cooling and/or lubricating medium such as a cooling and/or lubricating oil. Further multiple-disk clutch arrangements, such as are provided in a dual or multiple clutch device, may also be wet-running multiple-disk clutch arrangements. In one embodiment the multiple-disk clutch arrangement is arranged together with the other multiple-disk clutch arrangements inside a wet space which is delimited by a transmission housing bell and a cover assigned to the transmission housing bell.

In another embodiment of the clutch device, the force transfer element has actuation fingers which extend through clearances in the disk carrier so that the actuation force can be transferred to the disks of the disk stack of the multiple-disk clutch arrangement. The actuation fingers may be axial fingers, that is to say actuation fingers which extend essentially in the axial direction. The clearances may be provided in turn in a supporting or radial portion of the disk carrier. Owing to the clearances in the disk carrier and to the free spaces between the actuation fingers, a lightweight type of construction is implemented which nevertheless ensures a reliable transfer of the actuation force via the force transfer element to the disks of the multiple-disk clutch arrangement. Furthermore, even the actuation fingers extending into the clearances can bring about a simple rotary take-up connection in the circumferential direction between the disk carrier and the force transfer element. Moreover, widening of the force transfer element in the region of the actuation fingers can be prevented by a margin of the clearances which points radially inward and on which the respective actuation finger can be supported.

Latching means may be provided at any location(s) on the force transfer element and/or on the disk carrier of the multiple-disk clutch arrangement, in order to bring about latching between the force transfer element and the disk carrier. In one embodiment of the clutch device the actuation fingers are introducible or introduced latchingly into the clearances in the disk carrier. Since the actuation fingers and the disk carrier may be arranged closely to one another in the region of the clearances in the disk carrier, relatively simple and small-build latching means or latching elements can be used, which may be produced either in one piece with the respective component or separately from the components. In one embodiment, the actuation fingers can be introduced or are introduced latchingly into the clearances in an axial direction in such a way that the force transfer element is supportable or supported captively in the opposite axial direction via the actuation fingers on the disk carrier.

In another embodiment of the clutch device, a restoring element for restoring the force transfer element is provided, the force transfer element being supportable or supported on the disk carrier counter to the restoring force of the at least one restoring element. In this embodiment, the restoring element may pretension the force transfer element against the disk carrier or else be detensioned even before the force transfer element is supported on the disk carrier. The first variant has in this case the advantage that the force transfer element is held in a mounting position on the disk carrier and is pretensioned against this, thus making it possible to simplify the mounting of a module composed of a multiple-disk clutch arrangement and of a force transfer element. The second variant is advantageous in as much as any latching or supporting means present for captively supporting the force transfer element on the disk carrier are subjected to lower load and have to withstand essentially only the dead weight of the force transfer element.

The restoring element for restoring the force transfer element may be arranged at any location within the clutch device. In one embodiment of the clutch device, the restoring element is arranged between the disk carrier, such as at a supporting and/or radial portion of the disk carrier, and the force transfer element. This makes it possible to restore the force transfer element especially directly and quickly. Alternatively or additionally to this, the at least one restoring element may be arranged between the disks, either between the outer disks or the inner disks, of the multiple-disk clutch arrangement, in order to take effect there. The arrangement of one or more restoring elements between the disks has the advantage that the disks are reliably separated from one another when actuation force is no longer exerted on the disk stack of the multiple-disk clutch arrangement, so that an especially low drag torque can be achieved. It may be advantageous if at least one restoring element is arranged or acts between the disk carrier and the force transfer element, while at least one further restoring element acts between the disks of the multiple-disk clutch arrangement, in order to combine the advantages of the two above-mentioned design variants so that they reinforce one another.

In order to cause the force transfer element to be restored, a restoring element of any form may be used for applying the restoring force. However, it may be advantageous in this regard to have a restoring spring, that is to say an elastically resilient restoring element, which is used in another embodiment of the clutch device. This restoring spring may be designed as a helical spring. The use of a helical spring is expedient particularly when the restoring element is to act between the disk carrier and the force transfer element. In this embodiment, however, the restoring element may also be designed as a cup spring. A cup spring may be used expediently both between the disk carrier and the force transfer element and between the disks of the multiple-disk clutch arrangement. In this embodiment, however, it is also conceivable to use a circumferentially wavy annular spring, of which the wave-like profile in the circumferential direction exerts a spring action in the axial direction. The use of a circumferentially wavy annular spring is recommended particularly when the restoring element is used between the disks of the multiple-disk clutch arrangement, since the circumferentially wavy annular spring can have a relatively small extent in the radial direction with respect to its cross section to an even greater extent than the abovementioned cup spring and can nevertheless exert a high spring action along a short axial excursion.

Supporting or latching elements which are to cause the force transfer element to be supported and, if appropriate, latched on or with the disk carrier may be produced in one piece with the force transfer element and/or with the disk carrier. This may make it necessary to carry out machining of the force transfer element and/or of the disk carrier. In one embodiment of the clutch device, the force transfer element is supportable and, if appropriate, latchable indirectly via at least one supporting element. In the case of a latchable supporting element, the supporting element may likewise be designed as a latching element. The supporting element, which may be a plastic element, may be fastenable or fastened both to the force transfer element and to the disk carrier. Irrespective of whether the supporting element is fastenable or fastened to the force transfer element or to the disk carrier, it may be fastened or is fastened latchingly to the force transfer element or to the disk carrier. The advantage of this is that the supporting element can first be fastened especially simply to the force transfer element or to the disk carrier in that the supporting element is latched with the force transfer element or the disk carrier. Subsequently, the force transfer element and the disk carrier can be brought together in such a way that the supporting element causes the force transfer element to be supported on the disk carrier via the supporting element and, if appropriate, also causes the force transfer element to be latched with the disk carrier by means of the supporting element. Thus, in the mounting context, it is markedly simpler to produce a module which is composed of the multiple-disk clutch arrangement and of the force transfer element and which can subsequently be processed further or fitted simply and reliably.

In a further preferred embodiment of the clutch device, the supporting element is insertable or inserted into one of the clearances in the disk carrier, the supporting element in the clearance cooperating supportingly and, if appropriate, latchingly with the respective actuation finger. The supporting element may be arranged within the clearance so as to save construction space, while, furthermore, the supporting element can bring about at this location additional centering of the force transfer element via the actuation finger adjacent to the supporting element. Moreover, furthermore, the supporting element can act at this location as a guide for the actuation finger, so that the supporting element assumes a double function here. Furthermore, the supporting element, by being suitably arranged at this location, can prevent the actuation fingers from butting against the margin of the clearances and can thus reduce the amount of noise generated and wear at this location. The latter is the case particularly when the force transfer element and the disk carrier are manufactured from metal, whereas the supporting element is formed from plastic.

In another embodiment of the clutch device, the supporting element is latchable or latched with the respective actuation finger in the circumferential direction, or in both circumferential directions, or only in the circumferential direction. Thus, for example, lateral latching tongues may be provided on the supporting element, which latch with or latch into the respective actuation finger in opposition to the circumferential directions.

In order to achieve the above-mentioned advantage of a smaller amount of noise generated and lower wear on the actuation fingers and/or the disk carrier, in another embodiment of the clutch device, the actuation fingers may be supportable or supported on the disk carrier, with the supporting element interposed, in the circumferential direction, or in both circumferential directions, or also in at least one of the radial directions. The support also in at least one of the radial directions can in this case bring about the centering of the force transfer element in relation to the disk carrier, without direct contact occurring between the actuation fingers and the disk carrier.

In order to cause the force transfer element to be supported reliably on the disk carrier of the multiple-disk clutch arrangement, at least one of the actuation fingers, such as an actuation finger cooperating with one of the above-mentioned supporting elements, may be designed in the manner of a hook or hammerhead engaging behind the margin of the clearance and/or the supporting element. Such a geometry can be generated relatively simply on the actuation finger or the force transfer element. In this embodiment, it is the hook or hammerhead may extend in the circumferential direction. This ensures that the hook or hammerhead is produced especially simply. Alternatively, the hook or hammerhead may also extend in the radial direction.

In a further embodiment of the clutch device, a latching depression, latching clearance, or latching window, into which the supporting element is latchable or latched, is provided in at least one of the actuation fingers. A latching depression, latching clearance or latching window can be produced simply in the context of the manufacturing of the force transfer element and may enable the supporting element to function as a latching element to project relatively far into the region of the actuation finger, so that a reliable support of the force transfer element on the disk carrier of the multiple-disk clutch arrangement via the actuation fingers and the supporting element can be achieved.

In order to achieve simple latching, on the one hand, and reliable support, on the other hand, by means of the supporting element functioning as a latching element, in another embodiment of the clutch device, the supporting element has at least one elastic latching tongue on which preferably a latching nose is provided. Thus, for example, at least one latching tongue can be provided for fastening the supporting element latchingly to the force transfer element or to the disk carrier, while at least one other latching tongue on the supporting element causes the latching of the force transfer element and disk carrier when said components are brought together. In this embodiment, it may be preferable if the supporting element has a frame-like basic body on which the above-mentioned latching tongue is arranged, the latching tongue possibly being produced in one piece with the frame-like basic body. The frame-like basic body may have various advantages. Thus, for example, this could be placed or pushed especially simply onto one of the actuation fingers, in order to cause the supporting element to be fastened to the force transfer element or its actuation finger. Conversely, such a frame-like basic body of the supporting element can be inserted reliably and firmly into the clearance in the disk carrier, insofar as the supporting element is to be fastened to the disk carrier. Finally, it should be mentioned that a frame-like basic body of the supporting element can reliably prevent the actuation finger from butting against the margin of the clearance or against the disk carrier in one of the circumferential directions or in one of the radial directions, as a result of which the generation of an excessive amount of noise and a greater wear in this region are avoided, as already indicated above.

In another embodiment of the clutch device, the force transfer element is supportable or supported captively on the disk carrier of the multiple-disk clutch arrangement at least in the two axial directions. In the mounting context, therefore, it is not possible for the force transfer element to fall out.

In order to achieve a simple set-up of the clutch device and achieve the captive support of the force transfer element on the disk carrier without any increased outlay in structural terms, in another embodiment of the clutch device, the force transfer element may be designed in such a way that it transfers an actuation force for actuating the multiple-disk clutch arrangement to the multiple-disk clutch arrangement in the ratio of 1:1. In order to make the captive support and the set-up simpler, the actuation force for actuating the multiple-disk clutch arrangement is in this embodiment transferable by the force transfer element without any leverage. Thus, in this embodiment, it is the force transfer element may have a pot-like set-up in cross section and be designed to be essentially rigid. Also, in this embodiment, it is may be preferable if the force transfer element contributes essentially no intrinsic force when transferring the actuation force to the multiple-disk clutch arrangement.

Thus the mounting of a clutch device according to these teachings is simplified. This is the case particularly when, as in one embodiment of the clutch device, the force transfer element forms a coherently fittable or fitted module with the multiple-disk clutch arrangement. If the module comprising the multiple-disk clutch arrangement and the force transfer element is fitted, the force transfer element is supported or supportable captively on the disk carrier of the multiple-disk clutch arrangement, so that the module can be connected to other modules, structural units or subassemblies of the clutch device or of a drive train, without the risk that the force transfer element comes loose from the disk carrier or the multiple-disk clutch arrangement. In this embodiment, it may be preferable, furthermore, if, to provide a tie-up of the force transfer element to an actuation element of an actuation device for actuating the multiple-disk clutch arrangement, said module is connectable or connected to the actuation device or to a component adjacent to the actuation device. The actuation element may be an actuation piston which may be drivable hydraulically. In this design variant, therefore, the force transfer element and the actuation element belong to different structural units or modules, so that these are not fitted together or simultaneously, but, instead, separately and independently of one another. The captive supportability of support of the force transfer element on the disk carrier in the context of the modular type of construction makes it possible to separate the actuation element and force transfer element expediently during mounting, especially since the actuation device is often and advantageously already provided, together with the actuation element or actuation piston, on the transmission side.

In another embodiment of the clutch device, in order to avoid corotation of the actuation element and therefore, particularly in the case of hydraulically actuatable multiple-disk clutch arrangements, a centrifugal oil pressure in the assigned pressure chamber, the force transfer element may be tieable or tied to the actuation element, with a bearing being interposed for rotary take-up decoupling, which may be designed as a rolling bearing. In this embodiment, the bearing may be arranged either on the actuation element or on the force transfer element. In the first-mentioned case, the bearing would therefore be designed as part of the structural unit which comprises the actuation device together with the actuation element, while in the second-mentioned case the bearing would belong to the module composed of the multiple-disk clutch arrangement and of the force transfer element.

In order to simplify the tie-up of the force transfer element to the actuation element of the actuation device in the mounting context, the module composed of the multiple-disk clutch arrangement and of the force transfer element has, in another embodiment of the clutch device, a carrying tube, on which the disk carrier is supportable or supported in the radial direction, the carrying tube being connectable or connected to the actuation device or to a component adjacent to the actuation device. In this case, it may be advantageous if the disk carrier is supportable on the carrying tube rotatably in the radial direction, this taking place possibly with a rolling bearing being interposed. The rolling bearing may therefore also be part of the above-mentioned module. In this embodiment, the disk carrier may also be supportable or supported on the carrying tube in at least one axial direction. Said axial support of the disk carrier may give rise to a reliable predetermined axial arrangement of the disk carrier when the carrying tube is connected to the actuation device or to the adjacent component. The carrying tube may be connectable or connected to the actuation device or to an adjacent component by screwing. Thus, the carrying tube may have, for example, an external or an internal thread which can be screwed into or onto a corresponding internal or external thread on the actuation device or on the component adjacent to the actuation device. Said adjacent component, mentioned here and also above and below, of the actuation device may be, for example, a fixed housing, such as a transmission housing, on which the actuation device is also arranged in this case.

In another embodiment of the clutch device, the above-mentioned module has a torsional vibration damper, the output side of which is supportable or supported on the input side of the multiple-disk clutch arrangement. The torsional vibration damper can thus also be fitted expediently as an integral part of the module, together with the multiple-disk clutch arrangement and the force transfer element, in the mounting context. In this embodiment, the output side of the torsional vibration damper may be supportable or supported captively on the input side of the multiple-disk clutch arrangement. This may take place, for example, by means of a securing ring which supports in the axial direction the torsional vibration damper introduced into the disk carrier. Captive support may likewise be brought about by welding the output side of the torsional vibration damper to the input side of the multiple-disk clutch arrangement. In this embodiment, the above-mentioned disk carrier, which may have clearances, can form the input side of the multiple-disk clutch arrangement. Said disk carrier may also be designed as an outer disk carrier.

In another embodiment of the clutch device, the module is connectable or connected to the actuation device or to an adjacent component in such a way that the force transfer element is directly or indirectly pretensioned against the actuation element by the restoring element independently of the position of the actuation element. Thus, separation of the force transfer element from the actuation element during operation is prevented, so that noisy butting of the actuation element indirectly or directly against the force transfer element during renewed actuation is absent. In order, in this embodiment, also to bring about a relief of the disk carrier or of the supporting element, provided if appropriate, it may in this case be preferable, furthermore, if the force transfer element is pretensioned against the actuation element, but not against the disk carrier or the supporting element. In this design variant, the actual support of the force transfer element on the disk carrier, if appropriate with the supporting element interposed, therefore takes place only during mounting, whereas support is absent after the module has been connected to the actuation device or to an adjacent component. In this embodiment, the support therefore serves as a mounting safeguard during the mounting or demounting of the module, while, after mounting, any supporting element present can remain, under no load and therefore largely free of wear, on the module.

In another embodiment of the clutch device, the clutch device is designed as a multiple clutch device, such as a dual clutch device. In this embodiment, the clutch device designed as a multiple clutch device has a second multiple-disk clutch arrangement, assigned to a second transmission input shaft and may likewise be of the wet-running type, for selective torque transfer between the drive unit and the second transmission input shaft, the second multiple-disk clutch arrangement being actuable, preferably hydraulically, via a second force transfer element. The captive support of the second force transfer element, too, is configured relatively simply, especially since it is supported or supportable captively on the first force transfer element in an axial direction. In this case, the second force transfer element may be arranged in the axial direction between the first force transfer element and the multiple-disk clutch arrangement or the disk carrier of the multiple-disk clutch arrangement. In this embodiment, therefore, no additional latching or supporting means has to be provided, especially since the captive support of the first force transfer element likewise brings about the captive support of the second force transfer element. In this embodiment, the second multiple-disk clutch arrangement and the second force transfer element may be designed as part of the coherently fittable or fitted module.

In another embodiment of the clutch device, the second force transfer element has actuation fingers, if appropriate axial fingers, which extend through clearances in a second disk carrier, if appropriate in a supporting and/or radial portion of the second disk carrier, of the second multiple-disk clutch arrangement, in order to be able to act on the disk stack of the second multiple-disk clutch arrangement. In this case, it may be preferable if the second disk carrier is connected fixedly in terms of rotation to the abovementioned first disk carrier, and if both disk carriers are designed as outer disk carriers. As already indicated above, no additional supporting elements have to be provided for the second disk carrier and the second force transfer element in order to bring about the captive support of the second force transfer element on the second disk carrier. Nonetheless, in this embodiment, guide elements may be inserted into the clearances in the second disk carrier, via which guide elements the actuation fingers of the second force transfer element are supportable or supported on the second disk carrier in the circumferential direction and/or radial direction. Thus, although said guide elements in the clearances of the second disk carrier have no supporting function in the axial direction, they can guide the actuation fingers within the clearances and prevent butting against the second disk carrier in at least one of the circumferential directions and/or in one of the radial directions, so that the generation of noise and wear at this location are minimized.

In another embodiment of the clutch device which is designed as a dual clutch device, the latter may be a concentric dual clutch device in which the two multiple-disk clutch arrangements are consequently arranged so as to be nested radially. In other words, the two disk stacks of the two multiple-disk clutch arrangements may be arranged so as to be nested radially.

The present disclosure relates, furthermore, to a drive train of a motor vehicle with a drive unit and with a transmission, a clutch device being arranged between the drive unit and the transmission. The drive unit may be an internal combustion engine, such as a piston engine or a reciprocating engine, while the transmission may be designed as a dual clutch transmission, in this case the clutch device may be as a dual clutch device.

DESCRIPTION OF THE DRAWINGS

Embodiments are explained in more detail below by means of exemplary embodiments, with reference to the accompanying drawings in which:

FIG. 10 shows various views of the supporting element shown in FIGS. 8 and 9.

DESCRIPTION OF ILLUSTRATIVE EMBODIMENTS

Figure 1:
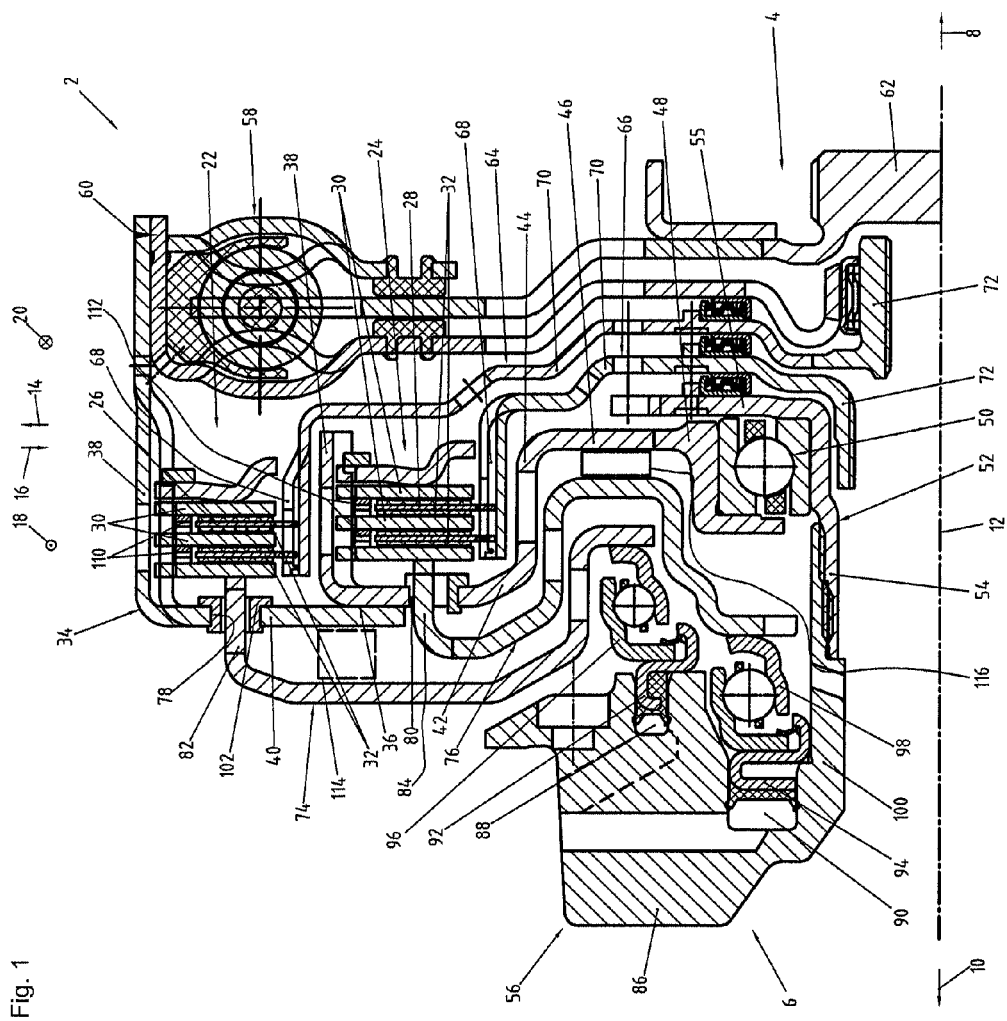
FIG. 1 shows a side view of an embodiment of the clutch device.
Figure 2:
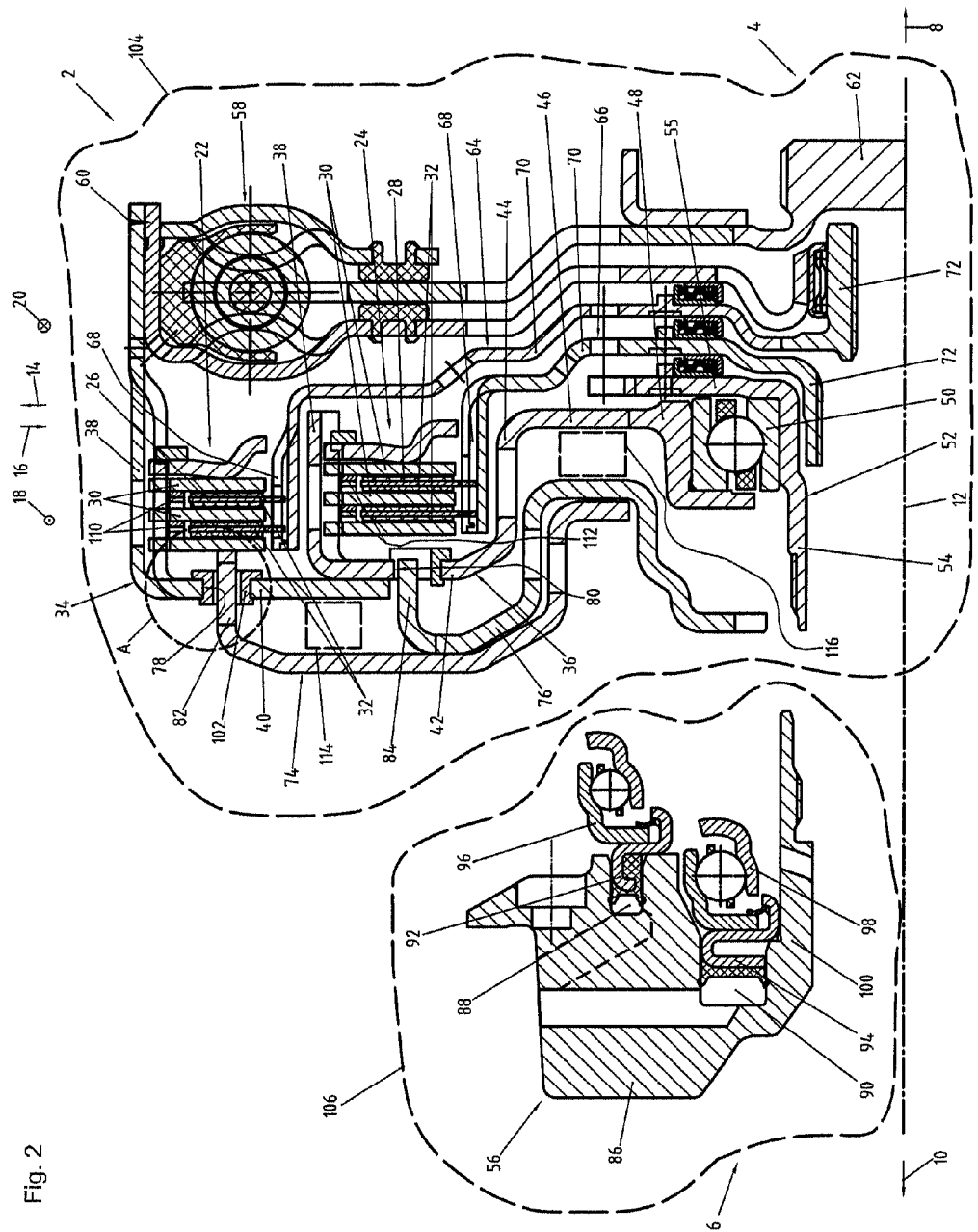
FIG. 2 shows the clutch device of FIG. 1 before the connection of the module to the actuation device.

FIGS. 1 and 2 show an embodiment of the clutch device 2. The clutch device 2 is designed as a multiple clutch device, being a dual clutch device in the present case. More specifically, it is a concentric dual clutch device. The clutch device 2 is arranged within a drive train of a motor vehicle between a drive unit 4, which is indicated merely diagrammatically in FIG. 1, and a transmission 6, which is likewise indicated merely diagrammatically in the figures. The drive unit 4 is preferably formed by an internal combustion engine, especially preferably by a piston engine or reciprocating engine, while the transmission 6 is a dual clutch transmission. The clutch device 2 is arranged between the drive unit 4 and the transmission 6 in the axial directions 18, 10 opposite to one another, the axis of rotation 12 of the clutch device 2 extending in the axial directions 8, 10 opposite to one another. Furthermore, in the figures, the radial directions 14, 16 opposite to one another and the circumferential directions 18, 20 of the clutch device 2 which are opposite to one another are illustrated by corresponding arrows. The two transmission input shafts of the transmission 6, which are not illustrated, extend along the axis of rotation 12 in the axial directions 8, 10, one of the two transmission input shafts being designed as a hollow shaft through which the other transmission input shaft extends coaxially. The two transmission input shafts, not illustrated in any more detail, are therefore arranged so as to be nested in the radial direction 14, 16.

The clutch device 2 may include a first multiple-disk clutch arrangement 22, which is assigned to the first transmission input shaft, not illustrated, and a second multiple-disk clutch arrangement 24, which is assigned to the second transmission input shaft, not illustrated. Since the clutch device 2 is a concentric dual clutch device, the two clutch arrangements 22, 24 are arranged so as to be nested in the radial direction 14, 16. The first multiple-disk clutch arrangement 22 may therefore also be designated as an external multiple-disk clutch arrangement 22, while the second multiple-disk clutch arrangement 24 may also be designated as an internal multiple-disk clutch arrangement 24. Both multiple-disk clutch arrangements 22 and 24 are wet-running multiple-disk clutch arrangements. Moreover, the two multiple-disk clutch arrangements 22, 24 are in each case actuable hydraulically, as will be explained in more detail later.

The two multiple-disk clutch arrangements 22, 24 have in each case a disk stack 26, 28 comprising alternating succeeding outer disks 30 and inner disks 32. The outer disks 30 are in this case designed as disks free of friction lining or steel disks, while the inner disks 32 are designed as disks with a friction lining or friction disks. The friction lining is preferably a paper friction lining. While the first multiple-disk clutch arrangement 22 serves for selective torque transfer between the drive unit 4 and the first transmission input shaft, which is designed here as an external hollow shaft, the second multiple-disk clutch arrangement 24 serves for selective torque transfer between the drive unit 4 and the second transmission input shaft, which, in the embodiment illustrated, is to be designed as an internal second transmission input shaft, even though this is not shown in the figures.

The two multiple-disk clutch arrangements 22, 24 have in each case an outer disk carrier, to be precise a first disk carrier 34 and a second disk carrier 36. The two disk carriers 34, 36 have in each case an essentially tubular outer disk carrying portion 38 and a supporting portion 40, 42 which adjoins the outer disk carrying portion 38 in the actual direction 10 and extends inward in the radial direction 16 and which, on account of its direction of extent, may also be designated as a radial portion. The supporting portions 40, 42 serve in this case for supporting the respective outer disk carrying portion 38 in the radial direction 14, 16. As is evident from FIGS. 1 and 2, the first and the second disk carrier 34, 36 are connected fixedly in terms of rotation to one another, this taking place preferably by the fastening of the supporting portion 40 to the supporting portion 42. In this case, welding of the supporting portion 40 to the supporting portion 42 has proved to be beneficial.

The supporting portion 42 merges inward in the radial direction 16 into a tubular portion 44 which extends in the actual direction 8, in order subsequently to merge into a radial portion 46 which is supported in the radial direction 14, 16 on a carrying tube 52 via a supporting hub 48, with the rolling bearing 50 interposed. The first and the second disk carrier 34, 36 are therefore supportable or supported on the carrying tube 52 rotatably in the radial direction 14, 16 and also in the axial direction 8. Support in the radial direction 14, 16 in this case takes place via a tubular portion 54 of the carrying tube 52, while support in the axial direction 8 takes place via a flange portion 55 extending in the radial direction 14 from that end of the tubular portion 44 which points in the axial direction 8. The carrying tube 52 is connectable or connected in the axial direction 10 to an actuation device 56, this preferably taking place by screwing, as indicated in FIG. 1. The set-up of the actuation device 56 is dealt with in more detail later. Since the tubular portion 44 is arranged so as to be nested radially with the disk stacks 26, 28, an especially compact and space-saving set-up of the clutch device 2 can be achieved.

The two disk carriers 34, 36 also form the input side of the respective multiple-disk clutch arrangement 22, 34. In this case, the input side of the two multiple-disk clutch arrangements 22, 24 is supportable or supported fixedly in terms of rotation and captively on an output side of a torsional vibration damper 58. For this purpose, the outer disk carrying portion 38 of the first multiple-disk clutch arrangement 22 is designed to project in the axial direction 8 beyond the outer disk carrying portion 38 of the second multiple-disk clutch arrangement 34, so that the torsional vibration damper 58 is received fixedly in terms of rotation within the outer disk carrying portion 38 of the first multiple-disk clutch arrangement 22. In order to connect the output side of the torsional vibration damper 58 fixedly in terms of rotation and captively to the input side of the multiple-disk clutch arrangements 22, 24 in the form of the prolonged outer disk carrying portion 38, the output side of the torsional vibration damper 58 is welded to the prolonged outer disk carrying portion 38, as indicated by the weld 60 in the figure. By contrast, the input side of the torsional vibration damper 58 is connectable or connected fixedly in terms of rotation to the output side of the drive unit 4 via an input hub 62. By the input side of the multiple-disk clutch arrangements 22 and 24 being supported on the carrying tube 52, the transmission input shafts remain largely uninfluenced by vibrations of the drive shaft of the drive unit 4, and vice versa.

The output sides of the multiple-disk clutch arrangements 22, 24 are formed in each case by inner disk carriers 64, 66 which have an essentially tubular inner disk carrying portion 68 and a supporting portion 70 which adjoins the latter in the axial direction 8 and extends inward in the radial direction 16 and which merges inward in the radial direction 16 into an output hub 72 which is in each case in rotary take-up connection to one of the two transmission input shafts.

So that an actuation force can be transferred from the above-mentioned actuation device 56 to the multiple-disk clutch arrangements 22, 24, the first multiple-disk clutch arrangement 22 is assigned a first force transfer element 74, while the second multiple-disk clutch arrangement 24 is assigned a second force transfer element 76. Both force transfer elements 74, 76 are arranged on that side of the supporting portion 40, 42 which faces away from the respective disk stack 26, 28, the second force transfer element 76 being arranged or included in the axial direction 8, 10 between the supporting portion 42 and the first force transfer element 74. Both force transfer elements 74, 76 transfer the actuation force of the actuation device 56 to the respective multiple-disk clutch arrangement 22, 24 in the ratio of 1:1 and without leverage, neither of the two force transfer elements 74, 76 contributing any intrinsic force. Thus, in particular, the force transfer elements 74, 76 are not designed as resilient force transfer elements or as cup springs, but instead as relatively rigid force transfer elements.

So that the force transfer elements 74, 76 arranged behind the supporting portions 40, 42 in the axial direction 10 can act preferably directly on the respective disk stack 26, 28 of the multiple-disk clutch arrangement 22, 24, clearances 78 succeeding one another in the circumferential direction 18, 20 are provided in the supporting portion 40, while clearances 80 succeeding one another in the circumferential direction 18, 20 are provided in the supporting portion 42. By contrast, actuation fingers 82, 84 are provided externally in the radial direction 14 on the force transfer elements 74 and 76 and extend in the axial direction 8 through the clearances 78, 80 as far as the disk stack 26, 28 of the respective multiple-disk clutch arrangement 22, 24, so that the actuation force of the actuation device 56 can be transferred to the multiple-disk clutch arrangements 22, 24. Since the actuation fingers 82, 84 extend essentially in the axial direction 8 as far as their free end, they may also be designated as axial fingers.

At their portion arranged further inward in the radial direction 16, the two force transfer elements 74, 76 are operatively connected to the actuation device 56 which is a hydraulic actuation device. It is evident from FIG. 1, furthermore, that the force transfer elements 74, 76 are bulged in their region lying further inward in the radial direction 16, in order to extend at least partially into the inner space surrounded by the tubular portion 44 and thus also to be arranged so as to be partially nested radially with the disk stacks 26, 28 of the multiple-disk clutch arrangements 22, 24. As already indicated above, an especially compact and space-saving set-up is thereby achieved. The actuation device 56 itself has a fixed housing 86 which is preferably fastened to a housing, not illustrated in any more detail, of the transmission 6 or is formed as part of same. A first pressure chamber 88 capable of being acted upon hydraulically with pressure and a second pressure chamber 90 capable of being acted upon hydraulically with pressure are formed in the fixed housing 86, the two pressure chambers 88, 90 being designed in each case as annular chambers, in which a first ring-shaped actuation element 92 and a second ring-shaped actuation element 94 are respectively guided displaceably in the axial directions 8, 10. The two actuation elements 92, 94 are designed as actuation pistons.

That end of the first force transfer element 74 which is internal in the radial direction 16 is supported, preferably under pretension, in the axial direction 10 on the first actuation element 92, with a rolling bearing 96 being interposed for rotary take-up decoupling in the circumferential direction 18, 20, while that end of the second force transfer element 96 which is internal in the radial direction 16 is supported, preferably under pretension, in the axial direction 10 on the second actuation element 94, with a rolling bearing 98 interposed. While the actuation elements 92, 94 are in each case supported in the axial direction 10 solely at the corresponding rolling bearing 96, 98, the rolling bearings 96, 98 are arranged and secured on the respective actuation element 92, 94 with regard to the axial directions 8, 10. Alternatively, the actuation elements 92, 94 could be supported at the rolling bearings 96, 98 solely in the axial direction 8, while the rolling bearings 96, 98 are secured on the force transfer elements 94, 96 with regard to the axial directions 8, 10, although the first-mentioned design variant shown in FIG. 1 is preferred.

In the mounted state of the clutch device 2, as shown in FIG. 1, the carrying tube 52 is connected or screwed to a tubular portion 100 of the housing 86 or of the transmission housing, the transmission input shafts, not illustrated, extending in the axial direction 8 from the transmission 6 through the tubular portion 100 of the housing 86 and the tubular portion 54 of the carrying tube 52, in order to be in rotary take-up connection with the respective multiple-disk clutch arrangement 22, 24 by the output hubs 72.

The first force transfer element 74 is supportable or supported captively on the first disk carrier 34, designed as an outer disk carrier, of the first multiple-disk clutch arrangement 22. More specifically, the first force transfer element 74 is latched with the first disk carrier 34 in order to bring about the captive supportability or support of the first force transfer element 74 on the first disk carrier 34. Thus, the actuation fingers 82 of the first force transfer element 24 are introducible or introduced latchingly into the clearances 78 in the axial direction 8 in such a way that the entire first force transfer element 74 is supportable or supported captively on the first disk carrier 34 via the actuation fingers 82 in the opposite axial direction 10. In the embodiment illustrated, however, there is no direct support of the first force transfer element 74 on the first disk carrier 34, but instead the first force transfer element 74 is supportable in the axial direction 10 indirectly, via at least two, preferably at least three supporting elements 102 formed as a plastic element, on the first disk carrier 34 and is latched with this. In the embodiment illustrated, the supporting elements 102 are fastened to the first disk carrier 34, the supporting elements 102 being inserted into the clearances 78, in order to cooperate supportingly and latchingly with the actuation finger 82 moving through the clearance 78 in the axial direction 8, 10. It may additionally be pointed out, however, that the supporting element 102 could alternatively also be fastened to the first force transfer element 74 or to its actuation fingers 82, in order to cooperate supportingly and latchingly with the first disk carrier 34 which moves in relation to the first force transfer element 74 and therefore also to the supporting element 102.

The advantages of said captive support or supportability of the first force transfer element 74 in the axial direction 10 on the first disk carrier 34 by means of the supporting elements 102 become clear particularly from a consideration of FIG. 2. Thus, the first force transfer element 74 supported captively on the first disk carrier 34 forms with the first and second multiple-disk clutch arrangement 22, 24 and with the torsional vibration damper 58 a coherently fittable or fitted module 104. However, the actuation device 56 forms, together with the rolling bearings 96, 98 fastened to the actuation elements 92, 94, a structural unit 106 which is formed separately from the module 104 before final mounting. The limits between the module 104 and the structural unit 106 are indicated in FIG. 2 by dashed lines. In the modular type of construction illustrated, the structural unit 106 can first be fastened fixedly to the transmission housing, not illustrated, of the transmission 6. The module 104 can subsequently be connected to the structural unit 106 or fastened to this.

In the context of this mounting of the module 104 on the structural unit 106, the first force transfer element 74 could come loose from the module 104 in the axial direction 10 if captive support in the axial direction 10 were not ensured by the supporting elements 102. Thus, in the embodiment illustrated, the first force transfer element 74 is supportable captively not only in the axial direction 8 on the multiple-disk clutch arrangements 22, 24, but also in the axial direction 10 via the supporting elements 102 on the first disk carrier 34, so that the handling and mounting of the module 104 during connection to the structural unit 106 can be carried out simply and reliably. However, the second force transfer element 76 for the second multiple-disk clutch arrangement 24 is also supported or supportable captively as part of the module 104 both in the axial direction 8 on the multiple-disk clutch arrangement 24 and in the axial direction 10. In the embodiment illustrated, this is ensured in that, as already mentioned above, the second force transfer element 76 is arranged in the axial direction 8, 10 between the second disk carrier 36, on the one hand, and the first force transfer element 74, on the other hand, so that the second force transfer element 76 is supported or supportable captively in the axial direction 10 on the first force transfer element 74.

Since the captive support of the second force transfer element 76 in the axial direction 10 already takes place via the first force transfer element 74, no supporting elements in the sense of the supporting elements 102, but instead guide elements 108 are inserted into the clearances 80 assigned to the actuation fingers 84 of the second force transfer element 76 and are fastened there. The guide elements 108, too, are formed as plastic elements, but do not bring about either latching with the actuation fingers 84 or the captive support of these in the axial direction 10. On the contrary, the guide elements 108 are of frame-like design, so that, with the guide elements 108 interposed, the actuation fingers 84 are supportable or supported in the circumferential direction 18, 20 and/or in the radial direction 14, 16 on the margin of the clearances 80 and therefore on the second disk carrier 36. The guide elements 108 are therefore intended to bring about at this location reduced wear and low-noise guidance of the actuation fingers 84 within the clearances 80.

As is evident from FIGS. 1 and 2, a plurality of restoring elements 110, 112 are provided, the restoring elements 110 serving for restoring the first force transfer element 74 in the axial direction 10, while the restoring elements 112 serve for restoring the second force transfer elements 76 in the axial direction 10. In the embodiment illustrated, the restoring elements 110, 112 act in each case between the outer disks 30 of the disk stacks 26, 28, the restoring elements 110, 112 being arranged in each case on the outside diameter of the respective disk stack 26, 28. In order in this case to utilize expediently the relatively small construction space for restoring elements 110, 112, the restoring elements 110, 112 are in each case designed as continuous annular springs wavy in the circumferential direction 18, 20. Alternatively, however, cup springs may also be used at this location. Alternatively or additionally; restoring elements can also act between the disk carriers 34, 36, on the one hand, and the force transfer elements 74, 76, on the other hand, in which case these restoring elements could also be designed as restoring springs, helical springs or cup springs. In this case, it is preferable if the restoring elements 110, 112 acting between the disks 30 are supplemented by the restoring elements acting between the disk carriers 34, 36 and the force transfer elements 74, 76, the last-mentioned restoring elements being indicated diagrammatically in the figures and being given the reference symbols 114 and 116.

Thus the first force transfer element 74 and the second force transfer element 76 are supportable or supported on the first disk carrier 34 via the actuation fingers 82 and the supporting element 102 counter to the restoring force of the restoring elements 110, 112, 114, 116 which act in the axial direction 10. In this case, the first force transfer element 74 may either be pretensioned against the first disk carrier 34 by the restoring force of the restoring elements 110, 112, 114, 116 or be supportable on the first disk carrier 34 without pretension by the restoring force of the restoring elements 110, 112, 114, 116 if the module 104 is not yet connected to the structural unit 106 or to the actuation device 56.

In order to connect the module 104 to the structural unit 106 and therefore to tie up the force transfer elements 74, 76 to the associated actuation elements 92, 94, the carrying tube 52 merely has to be led in the axial direction 10 up to the tubular portion 100 of the structural unit 106, meanwhile fastened to the transmission housing, in order subsequently to rotate the carrying tube 52 in the circumferential direction 20 and thus screw it to the tubular portion 100. In other words, with the first force transfer element 74 supported in the axial direction 10 on the first actuation element 92 and with the second force transfer element 76 supported in the axial direction 10 on the second actuation element 94, the module 104 can be connected to the structural unit 106 or to the actuation device 56 in order to bring about said tie-up to the actuation elements 92, 94. The module 104 is connectable or connected to the structural unit 106 or to the actuation device 56 in such a way that the first force transfer element 74 is pretensioned against the first actuation element 92 indirectly via the rolling bearing 96 in the axial direction 8, 10 by the restoring elements 110 and 114, if appropriate also 112 and 116, independently of the position of the first actuation element 92, although the restoring force of the restoring elements 110 and 114, if appropriate also 112 and 116, does not cause any pretensioning of the first force transfer element 74 in the axial direction 10 against the first disk carrier 34 via the actuation fingers 82 and the supporting element 102 as soon as the module 104 has reached the fastening position, shown in FIG. 1, on the structural unit 106 or the actuation device 56. Thus, at the latest when the fastening position according to FIG. 1 is reached, there is no longer any support of the first force transfer element 74 on the first disk carrier 34 via the supporting element 102, so that, when the clutch device 2 is operating normally, the supporting element 102 is under no load and is therefore subject to low wear. Only when the module 104 is being demounted can the supporting element 102 exert its action again.

Four different design variants of the clutch device 2 according to FIGS. 1 and 2 are described below with reference to FIGS. 3 to 10, the preceding description of FIGS. 1 and 2 also applying to the respective design variant.

Figure 3:
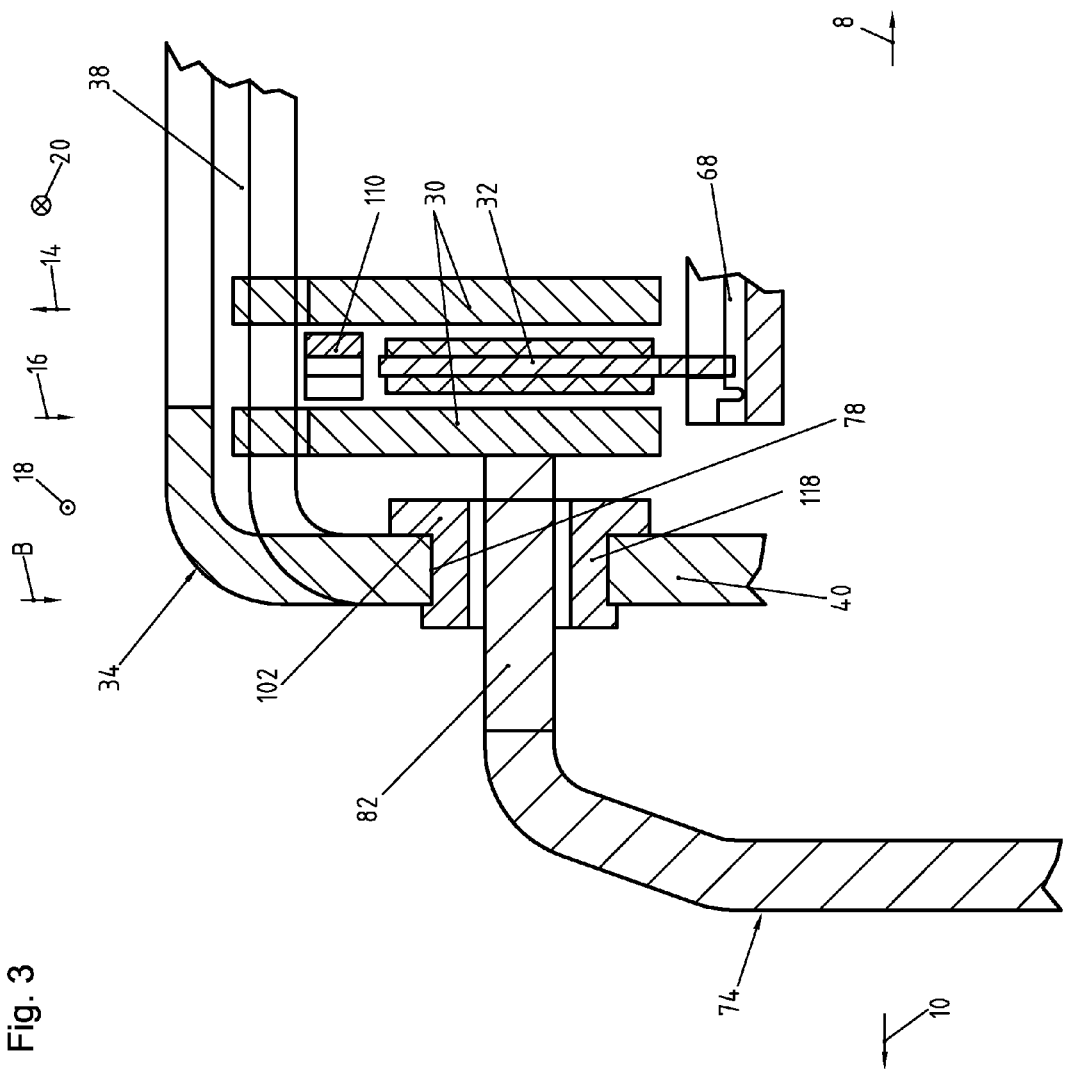
FIG. 3 shows an enlarged illustration of the detail A of FIG. 2 in one embodiment.
Figure 4:
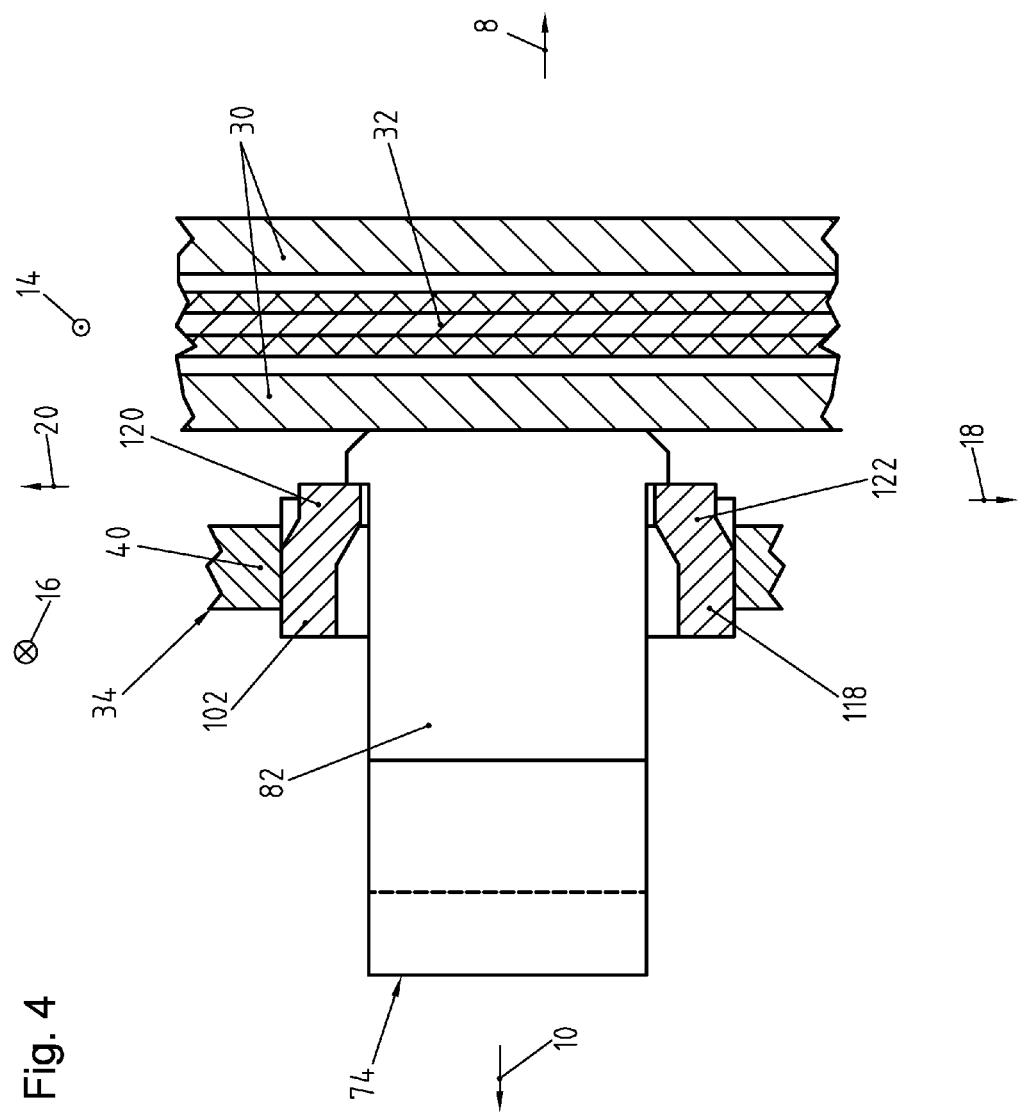
FIG. 4 shows a top view in the direction of the arrow B of FIG. 3.
Figure 5:
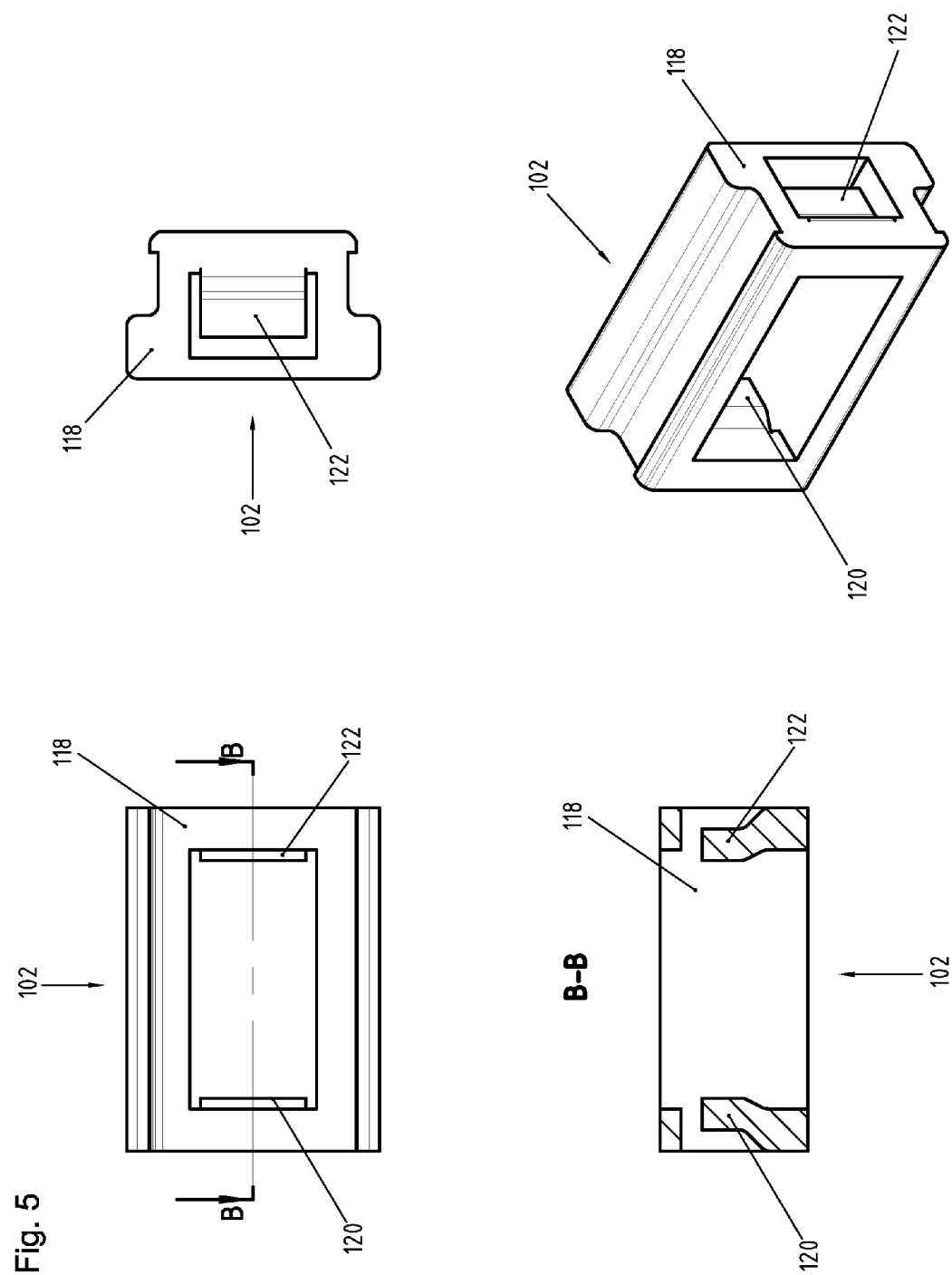
FIG. 5 shows different views of the supporting element from FIGS. 3 and 4.

A first design variant to FIGS. 1 and 2 is illustrated in FIGS. 3 to 5. As is evident from FIGS. 3 and 4, those actuation fingers 82 which are assigned to one of the supporting elements 102 are designed in the manner of a hammerhead engaging behind the supporting element 102 from inside. As is evident particularly from FIG. 4, the hammerhead in this case extends in the circumferential directions 18, 20. It may also be said that the actuation fingers 82 are of hammer-shaped design at their free end. The supporting element 102, which is inserted into the clearance 78 and is illustrated in various views in FIG. 5, has essentially a frame-like basic body 118 which surrounds an orifice which is continuous in the axial directions 8, 10 and through which the actuation finger 82 can extend. Furthermore, the supporting element 102 inserted into the clearance 78 with a form fit, preferably latchingly, and fastened therein has two latching tongues 120, 122 which lie opposite one another in the circumferential direction 18, 20 and preferably have a latching nose at their free end, although this latching nose is not illustrated in FIGS. 3 to 5. In the first design variant illustrated according to FIGS. 3 to 5, the supporting element 102 is latchable or latched with the respective actuation finger 82 via the latching tongues 120 and 122 solely in the two circumferential directions 18, 20, in that the elastically flexible latching tongues 120, 122 are restored elastically after the introduction of the actuation finger 82 in the form of a hammerhead and engage behind the hammerhead in this way, as can be seen particularly in FIG. 4.

Figure 6:
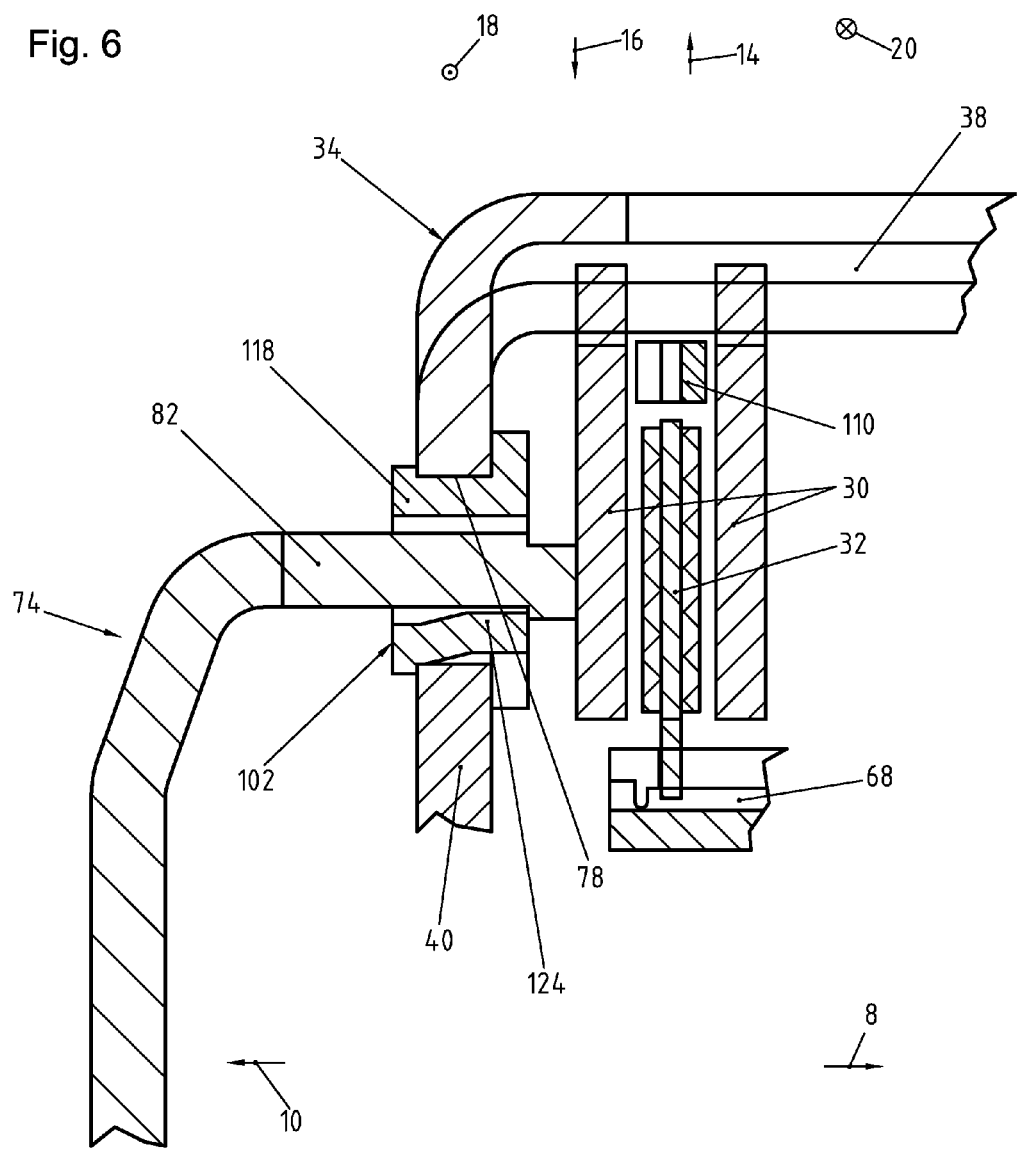
FIG. 6 shows the detail A of FIG. 2 in an enlarged illustration in another embodiment.

FIG. 6 shows a second design variant which is essentially identical to the first design variant according to FIGS. 3 to 5, and therefore only the differences will be dealt with below and the preceding description otherwise applies accordingly.

In the second design variant, the actuation finger 82 is designed in the manner of a hook engaging behind the supporting element 102, here the hook-shaped actuation finger 82 engaging behind the supporting element 102 inward in the radial direction 16. In other words, the hook extends in the radial direction 16. In this design variant, only one latching tongue 124 is provided which can be latched outward in the radial direction 14 with the actuation finger 82, in that, after the introduction of the actuation finger 82, the latching tongue 124 is latched elastically back into the supporting element 102 outward in the radial direction 14.

Figure 7:
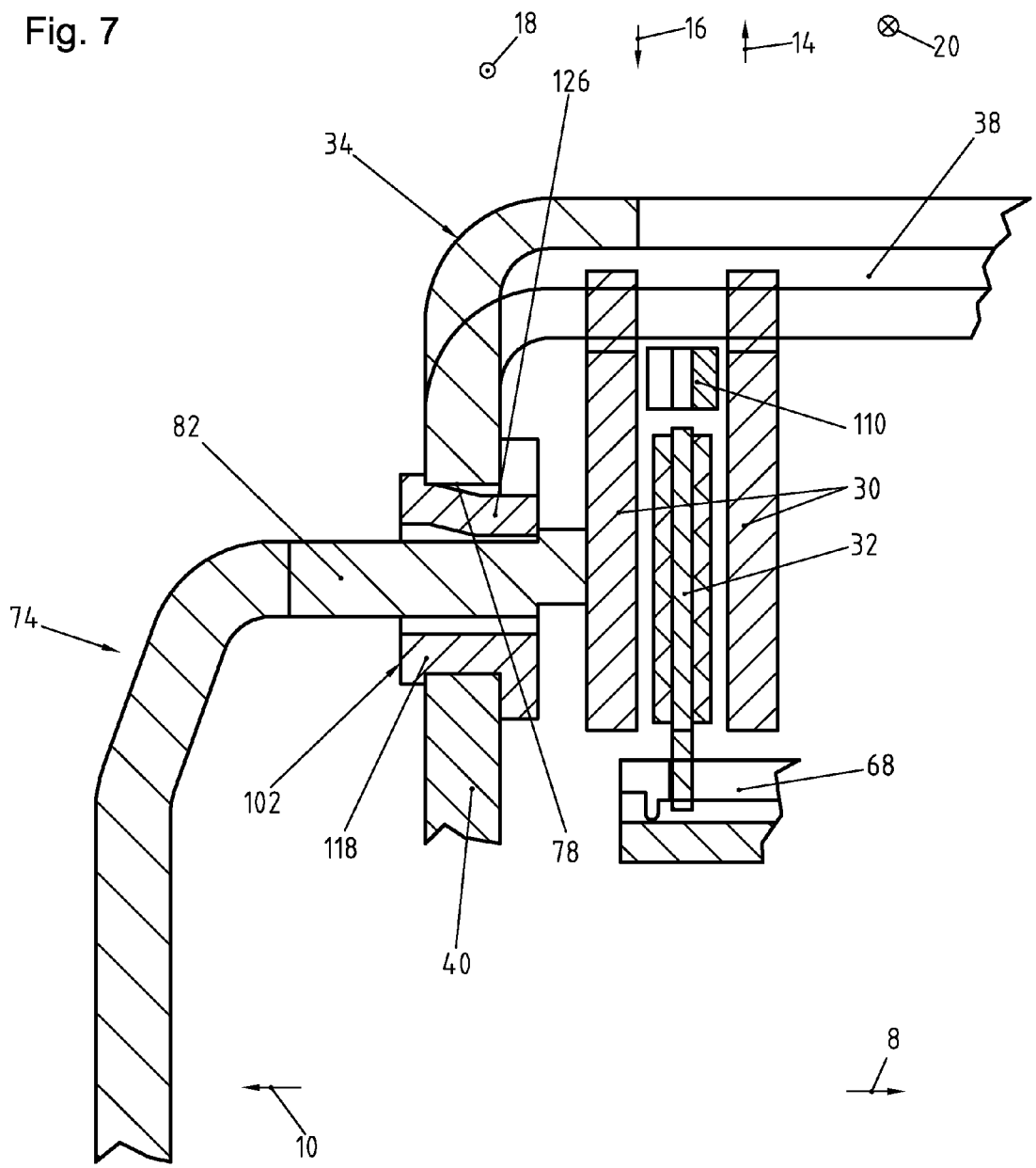
FIG. 7 shows the detail A from FIG. 2 in an enlarged illustration in another embodiment.

The third design variant according to FIG. 7 corresponds essentially to the design variant according to FIG. 6, and therefore only the differences are explained below and the preceding description otherwise applies accordingly.

In contrast to the second design variant, in the third design variant the actuation finger 82 designed in the manner of a hook extends outward in the radial direction 14, in order to engage behind the supporting element 102. A latching tongue 126 is correspondingly provided, which, in the detensioned state, projects inward in the radial direction 16 from the frame-shaped basic body 118 of the supporting element 102, in order to be able to engage behind the hook of the actuation finger 82, said hook extending outward in the radial direction 14.

The design variant according to FIGS. 8 to 10 corresponds essentially to the above-described design variants according to FIGS. 3 to 7, and therefore only the differences will be dealt with below and the preceding description otherwise applies accordingly.

Figure 8:
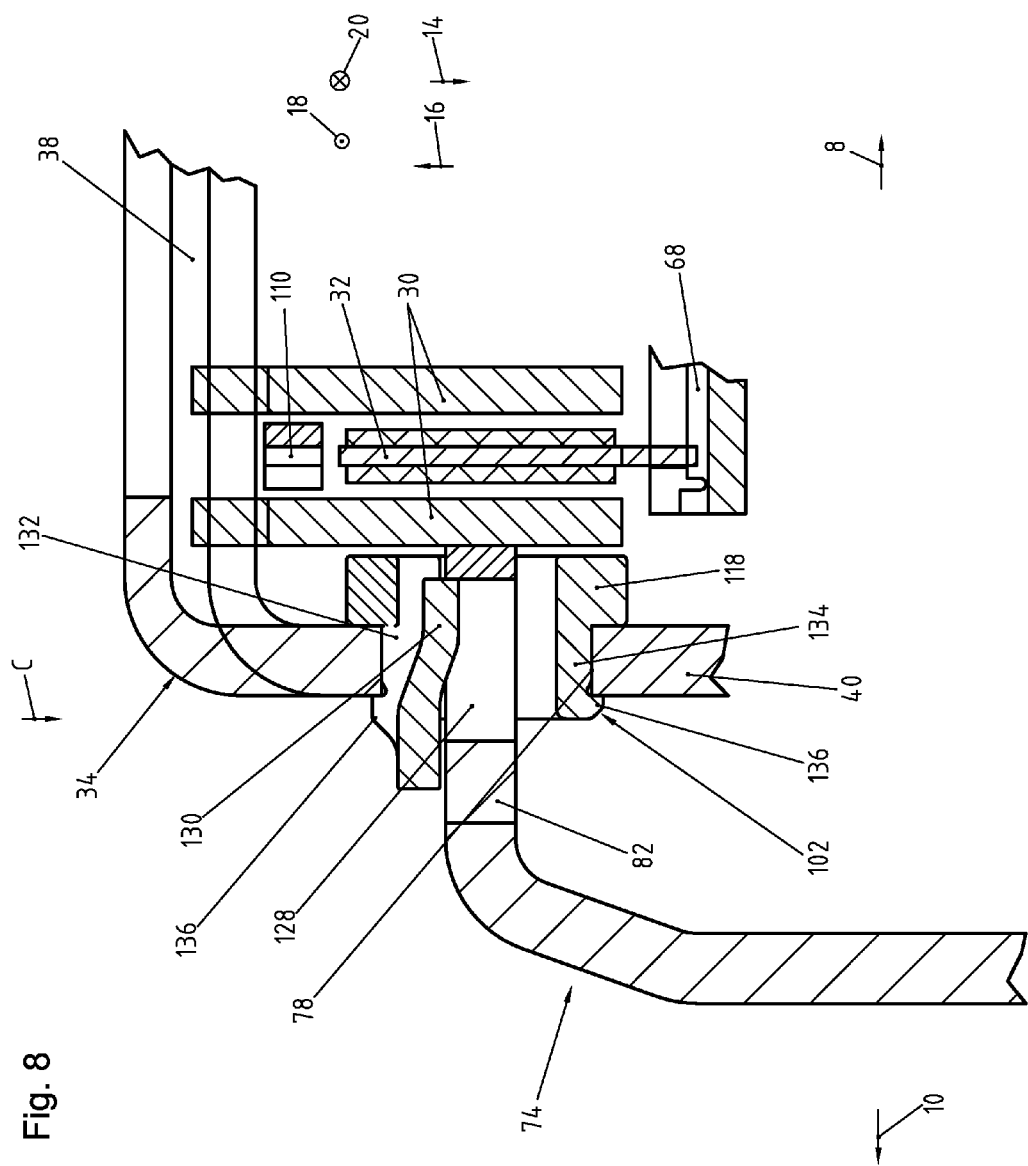
FIG. 8 shows the detail A of FIG. 2 in an enlarged illustration in another embodiment.
Figure 9:
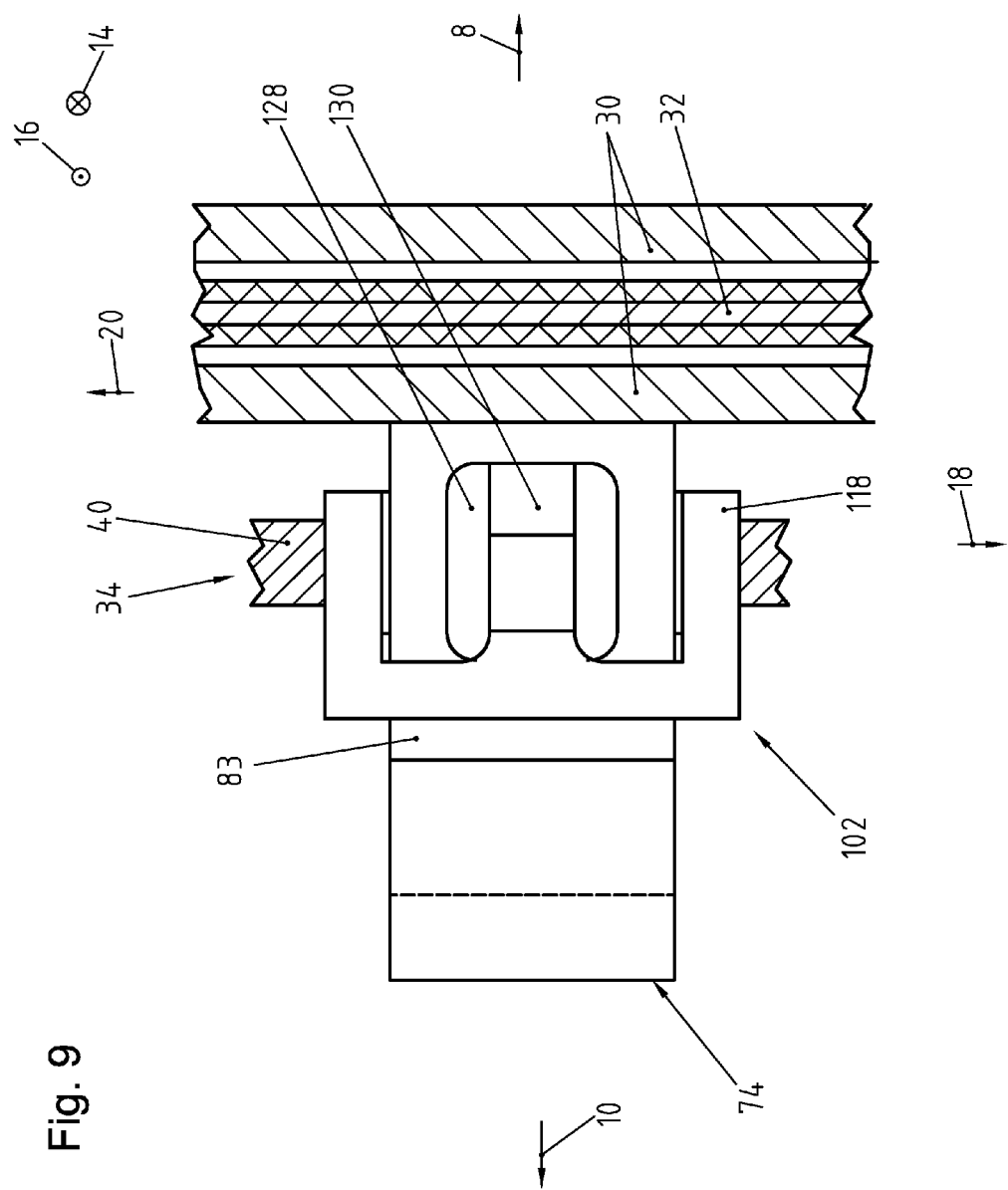
FIG. 9 shows a top view in the direction of the arrow C of FIG. 8 in a sectional illustration.

In the fourth design variant according to FIGS. 8 to 10, the actuation finger 82 has a latching depression, latching clearance or latching window. In the embodiment illustrated according to FIGS. 8 to 10, it should be a question of a latching window 128. The latching window 128 is formed continuously in the radial direction 14, 16, a latching tongue 130 again being arranged on the frame-shaped basic body 118 of the supporting element 102 and, as shown in FIGS. 8 and 9, being designed to be latchable into the latching window 128 inward in the radial direction 16. Alternatively, the supporting element 102 may also be inserted and fastened in the clearance 78 in such a way that the latching tongue 130 can be latched into the latching window 128 outward in the radial direction 14.

It is evident particularly from FIGS. 8 and 10 that, in the fourth design variant, the supporting element 102 has two further latching tongues 132, 134 with latching noses 136 which serve for fastening the supporting element 102 latchingly within the clearance 78, so that the supporting element 102 merely has to be pressed in the axial direction 10 in the clearance 78 in order by means of the elastic latching tongues 132 and 134, in conjunction with the latching noses 136, to bring about simple fastening of the supporting element 102 to the first disk carrier 34. This concept may advantageously also be transferred to the above-described supporting elements 102 according to the design variants in FIGS. 3 to 7.

Since the basic body 118 delimits the orifice in the supporting element 102 in the radial directions 14 and 16 and the circumferential directions 18 and 20 in all the design variants of the supporting element 102 according to FIG. 1 to 10, the actuation finger 82 can always be supportable or supported on the first disk carrier 34 in both circumferential directions 18, 20 and in at least one of the two radial directions 14, 16, with the supporting element 102 interposed, so that both the amount of noise generated and the wear are reduced at this location.

Regardless of the respective design variant, the first and, if appropriate, the second force transfer element 74, 76 and the first and, if appropriate, the second disk carrier 34, 36 are made from metal, whereas the supporting element 102 is formed as a plastic element, as already mentioned above. The plastic element was preferably produced separately first in order subsequently to be fastened to one of the two said components. Preferably at least two or three, especially preferably at most five supporting elements 102 are provided.

It is to be understood that the foregoing is a description of one or more non-limiting, illustrative embodiments. Furthermore, the statements contained in the foregoing description relate to particular embodiments and are not to be construed as limitations on the scope of the appended claims. Various other embodiments and various changes and modifications to the disclosed embodiment(s) will become apparent to those skilled in the art. All such other embodiments, changes, and modifications are intended to come within the scope of the appended claims.

The invention claimed is:

1. A clutch device, comprising:
   a multiple-disk clutch arrangement comprising a disk carrier;
   a force transfer element that actuates the multiple-disk clutch arrangement and that is supported by the disk carrier, wherein the force transfer element comprises an actuation finger which extends axially from a free end of the force transfer element so that it is perpendicular to the multiple-disk clutch arrangement; and
   a supporting element at least partly located between the force transfer element and the disk carrier at a location where the disk carrier supports the actuation finger.

2. The clutch device of claim 1, wherein the disk carrier and the force transfer element are latched together.

3. The clutch device of claim 1, wherein the force transfer element extends through clearances in the disk carrier in a first direction such that the force transfer element is supported by the disk carrier in an opposite direction.

4. The clutch device of claim 1, wherein the force transfer element is supported by the disk carrier in a direction counter to a restoring force of a restoring element.

5. The clutch device of claim 1, wherein the force transfer element and the supporting element are latched and at least one of the supporting element or the force transfer element comprises at least one of a latching depression, a latching clearance or a latching window.

6. The clutch device of claim 1, wherein the actuation finger extends through a clearance in the disk carrier and the actuation finger comprises a hook or hammerhead shape engaged behind a margin of the clearance.

7. The clutch device of claim 1, wherein the force transfer element is supported by the disk carrier in both axial directions.

8. The clutch device of claim 1, wherein the force transfer element is constructed and arranged so that it can transfer an actuation force to the multiple-disk clutch arrangement at a 1:1 ratio.

9. The clutch device of claim 1, wherein the force transfer element and the multiple-disk clutch arrangement together form a module for connection with an actuation device, wherein at least one of the module or the actuation device includes a bearing being interposed for rotary take-up decoupling.

10. The clutch device of claim 1 further comprising:
    a second multiple-disk clutch arrangement; and
    a second force transfer element that actuates the second multiple-disk clutch arrangement and that is supported by the first force transfer element, each multiple-disk clutch arrangement arranged to selectively transfer torque from a common drive unit to respective first and second transmission input shafts.

11. The clutch device of claim 10, wherein the second force transfer element extends through clearances in a second disk carrier.

12. The clutch device of claim 9 wherein the module comprises a torsional vibration damper having an output side supported by the multiple-disk clutch arrangement.

13. A clutch device, comprising:
    a multiple-disk clutch arrangement comprising a disk carrier; and
    a first force transfer element comprising a first actuating finger and a second force transfer element comprising a second actuating finger which each extend axially from a free end of the first and the second force transfer element so that they are perpendicular to the multiple-disk clutch arrangement and which extend through support elements latched with at least one of the disk carrier or the first or the second force transfer element.

14. A clutch device, comprising:
    a multiple-disk clutch arrangement comprising a disk carrier;
    a force transfer element that actuates the multiple-disk clutch arrangement and that is supported by the disk carrier, wherein the force transfer element comprises an actuation finger which extends axially from a free end of the force transfer element so that it is perpendicular to the multiple-disk clutch arrangement;
    wherein the force transfer element and the multiple-disk clutch arrangement together form a module for connection with an actuation device, wherein at least one of the module or the actuation device includes a bearing being interposed for rotary take-up decoupling; and
    wherein the module comprises a carrying tube supporting the disk carrier in a radial direction, the carrying tube being connectable to the actuation device.

15. A clutch device, comprising:
    a multiple-disk clutch arrangement comprising a disk carrier;
    a force transfer element that actuates the multiple-disk clutch arrangement and that is supported by the disk carrier, wherein the force transfer element comprises an actuation finger which extends axially from a free end of the force transfer element so that it is perpendicular to the multiple-disk clutch arrangement;
    a supporting element at least partly located between the force transfer element and the disk carrier at a location where the disk carrier supports the force transfer element; and
    wherein the supporting element is latched with the actuation finger in a circumferential direction.

16. A clutch device, comprising:
    a multiple-disk clutch arrangement comprising a disk carrier;
    a force transfer element that actuates the multiple-disk clutch arrangement and that is supported by the disk carrier, wherein the force transfer element comprises an actuation finger which extends axially from a free end of the force transfer element so that it is perpendicular to the multiple-disk clutch arrangement;
    a supporting element at least partly located between the force transfer element and the disk carrier at a location where the disk carrier supports the force transfer element; and wherein the actuation finger is supported by the disk carrier in a circumferential direction with at least a portion of the supporting element interposed therebetween.

* * * * *